United States Patent
Drasnin et al.

(10) Patent No.: US 7,210,014 B2
(45) Date of Patent: Apr. 24, 2007

(54) ALTERNATIVE METHODS IN MEMORY PROTECTION

(75) Inventors: Sharon Drasnin, Seattle, WA (US); Edward J Lansinger, Bellevue, WA (US); Richard D. Beckert, Lake Stevens, WA (US)

(73) Assignee: Microsoft Corporation, Redmond, WA (US)

( * ) Notice: Subject to any disclaimer, the term of this patent is extended or adjusted under 35 U.S.C. 154(b) by 391 days.

(21) Appl. No.: 10/855,065

(22) Filed: May 27, 2004

(65) Prior Publication Data

US 2005/0268058 A1 Dec. 1, 2005

(51) Int. Cl.
*G06F 12/00* (2006.01)

(52) U.S. Cl. ........................... 711/163; 711/154

(58) Field of Classification Search ................. 711/163
See application file for complete search history.

(56) References Cited

U.S. PATENT DOCUMENTS 6,125,390 A * 9/2000 Touboul ..................... 709/223
6,330,648 B1 * 12/2001 Wambach et al. .......... 711/163

* cited by examiner

*Primary Examiner*—Reba I. Elmore
(74) *Attorney, Agent, or Firm*—Lee & Hayes, PLLC (57) ABSTRACT

An exemplary system includes a microprocessor executing an operating system, a memory, a bus connecting the microprocessor to the memory, and a memory protection module controlling access to the memory independent of the microprocessor. Access to the memory may be based on a combination of an address, data, and memory control signals received from the microprocessor. A method includes, independent of the microprocessor executing an operating system, controlling access to a system memory based on a combination of signals received from the microprocessor.

27 Claims, 8 Drawing Sheets

ALTERNATIVE METHODS IN MEMORY PROTECTION

TECHNICAL FIELD

The described subject matter relates to electronic computing, and more particularly to alternate methods in memory protection.

BACKGROUND

Embedded systems, and other systems, typically include some kernel, or core, piece of code whose proper functioning is essential to the operation of the system. As used in this document, the kernel is the part of the multitasking system responsible for the management of tasks (i.e. for managing the CPU's time) and communicating between tasks. The fundamental service provided by the kernel is context switching. An embedded system is a specialized computer used to control a device such as an automobile, appliance or space vehicle. The kernel is typically embodied in a software image that includes an Operating System (OS) and related programs and data, which reside in memory at all times and provide basic services. Due to defective programs, it is possible that the kernel can be corrupted. If such corruption occurs, the reliability, safety, and performance of the system as a whole can be seriously degraded.

Defective programs can be introduced into a system in a number of ways. For example, in an automotive embedded system, code, including the kernel, is initially loaded into the system, which is built into the automobile. Later, the code can be updated by downloading new code into the system. The new code can be downloaded in a number of ways, such as in a service bay procedure or a wireless connection to a network. The code that is downloaded to the embedded system can have a bug (i.e., a persistent error) or a virus, both of which can corrupt any area in the system's memory, including the kernel or data used by the kernel.

In modern systems, unintentionally downloading a defective or malicious program (i.e., a program with a bug or virus) can be remarkably easy to do. In addition, in typical systems, a program can essentially write to any area of memory simply by loading an address and data, thereby instructing a microcontroller or microprocessor to write to the address with the data. Thus, once in a system, a defective program can easily overwrite valid bytes in the kernel, or other areas in memory, with invalid bytes. Of course, if the kernel is overwritten with invalid bytes, the functionality can be changed or the entire system can crash (i.e., fail).

Often, there is no elegant way for crash recovery and the system must be restarted. Unfortunately, a persistently defective or malicious program may cause the system to repeatedly crash, even after restarting, such that the device may be rendered inoperable.

SUMMARY

Implementations are described and claimed herein for controlling access to memory independent of the microprocessor executing the operating system. Implementations employ a memory protection module that monitors address, data, and control signals, and, based on the signals, determines whether a memory access is allowed based on a memory access policy. An implementation of the memory protection module can select among a plurality of memory access policies.

DETAILED DESCRIPTION

Overview

Briefly, memory protection involves controlling accesses to a specified region in memory. In a computing system, defective software can access areas of memory that the software should not access, thereby seriously impairing the proper operation of the computing system. Methods for memory protection discussed herein prevent an access to system memory if the access is not in accordance with a memory access policy and independent of a processing unit that executes the operating system.

Exemplary Computing Device

Figure 1:
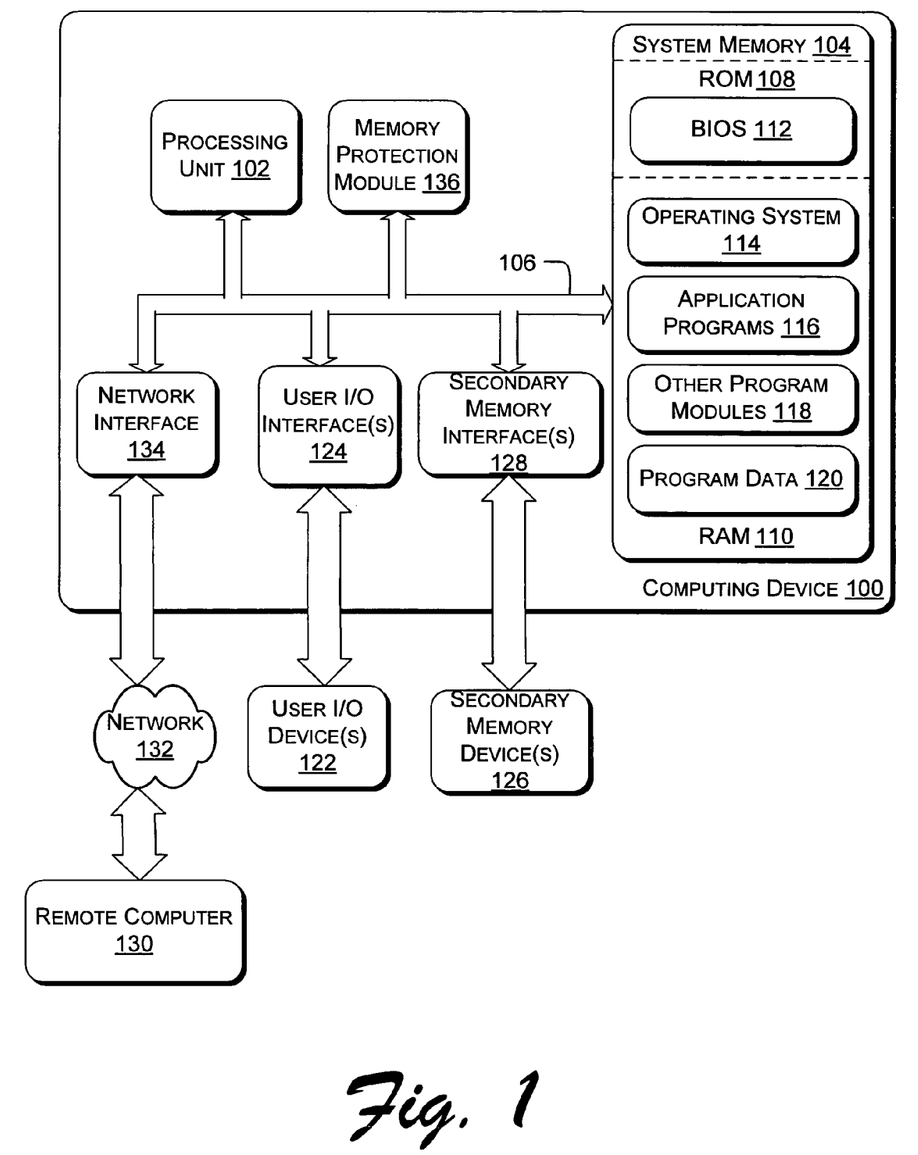
FIG. 1 illustrates a computing environment in which memory protection can be employed to control access to system memory.

FIG. 1 is a schematic illustration of a computing environment including an exemplary computing device 100, such as an embedded system or general computer, which can be utilized to implement memory protection methods. Computing device 100 includes one or more processors or processing units 102, a system memory 104, and a system bus 106 that couples various system components including the system memory 104 to processors 102. The bus 106 represents one or more of any of several types of bus structures, including a memory bus or memory controller, a peripheral bus, an accelerated graphics port, and a processor or local bus using any of a variety of bus architectures.

The system memory 104 includes read only memory (ROM) 108 and random access memory (RAM) 110. In an embedded system, the ROM 108 is frequently embodied in Flash memory, which can allow for relatively easy code updates. A basic input/output system (BIOS) 112, containing the basic routines that help to transfer information between elements within computing device 100, such as during start-up, is stored in ROM 108. The BIOS 112 typically contains a bootloader for loading 'bootstrap' code for starting up the computing device 100. A number of program modules may be stored in the RAM 110 including an operating system 114, one or more application programs 116, other program modules 118, and program data 120.

A user may enter commands and information into computing device 100 or receive output information from computing device 100 through user input/output (I/O) device(s) 122, such as a keyboard, a stylus, or a pointing device. Other I/O devices (not shown) may include a microphone, joystick, game pad, satellite dish, scanner, monitor (touch sensitive or not), keypad, or the like. These and other I/O devices are connected to the processing unit 102 through appropriate user I/O interface(s) 124 that are coupled to the bus 106.

Computing device 100 may include secondary memory device(s) 126, such as a hard disk drive (not shown) for reading from and writing to a hard disk (not shown), or a magnetic disk drive (not shown) for reading from and writing to a removable magnetic disk (not shown), or an optical disk drive (not shown) for reading from or writing to a removable optical disk (not shown) such as a CD ROM or other optical media. Other types of computer-readable media such as magnetic cassettes, flash memory cards, digital video disks, and the like, may also be used as secondary memory. The secondary memory device(s) 126 are connected to the bus 106 by appropriate secondary memory interface(s) 128. The secondary memory device(s) 126 and their associated computer-readable media provide nonvolatile storage of computer-readable instructions, data structures, program modules and other data for computing device 100.

Generally, the data processors of computing device 100 are programmed by means of instructions stored at different times in the various computer-readable storage media of the computer. Programs and operating systems may be distributed, for example, on floppy disks, CD-ROMs, or electronically, and are installed or loaded into the secondary memory of the computing device 100. At execution, the programs are loaded at least partially into the computing device's 100 system memory 104.

Computing device 100 may operate in a networked environment using logical connections to one or more remote computers, such as a remote computer 130. The remote computer 130 may be a personal computer, a server, a router, a network PC, a peer device or other common network node, and typically includes many or all of the elements described above relative to computing device 100. The logical connections depicted in FIG. 1 include a network 132 (e.g., local area network or wide area network). The logical connections may be wired, wireless, or any combination thereof.

The network 132 can include a number of networks and subnetworks through which data can be routed from the computing device 100 to the remote computer 130, and vice versa. The network 132 can include any number of nodes (e.g., DNS servers, routers, etc.) by which messages are directed to the proper destination node. Computing device 100 is connected to the network 132 through a network interface 134. The network interface 134 provides the means for establishing communications over the network 132. Examples of a network interface include, but are not limited to, a modem or network adapter. The network interface 134, which may be internal or external, is connected to the bus 106.

In a networked environment, program modules depicted relative to the computing device 100, or portions thereof, may be stored in a storage device at the remote computer 130. It will be appreciated that the network connections shown and described are exemplary and other means of establishing a communications link between the computers may be used.

The computing device 100 may be implemented as a server computer that is dedicated to server applications or that also runs other applications. Alternatively, the computing device 100 may be embodied in, by way of illustration, a stand-alone personal desktop or laptop computer (PCs), workstation, personal digital assistant (PDA), a Bluetooth-enabled cellular phone, embedded computing system, or electronic appliance, to name only a few.

A memory protection module (MPM) 136 protects the system memory 104 from specified memory accesses. The MPM 136 uses a memory access policy to secure specified regions in the system memory 104. The MPM 136 monitors addresses, data, and control signals from the bus 106 to determine whether a read or write to system memory 104 is in accordance with the memory access policy.

The MPM 136 can be implemented with discrete components, an application specific integrated circuit (ASIC), a field programmable gate array (FPGA), software, firmware, or other type of logic. When implemented in software, the MPM 136 resides in memory, such as system memory 104 or secondary memory media. During operation, software-implemented MPM 136 executes from system memory 104.

The MPM 136 operates independently from the processing unit 102. Thus, the MPM 136 is not controlled by the processing unit 102. The MPM 136 is physically separate from the processing unit 102 and the system memory 104. This does not mean that the MPM 136 must be a chip that is separate from chips embodying the processing unit 102 and/or the system memory 104. For example, the MPM 136 may be integrated onto the same die as the processing unit 102 and/or the system memory 104, but separate from the processing unit 102 and the system memory 104.

Because the MPM 136 is independent from the processing unit 102, a malicious programmer cannot create code to bypass the MPM 136. The same cannot be said for traditional address protection mechanisms implemented on the processing unit 102, which can be overcome by a malicious programmer who acts through the processing unit 102 to circumvent of disable the mechanisms' protective features. In addition, hardware implementations of the MPM 136 can make them less likely to be bypassed by software manipulation.

Exemplary System

Figure 2:
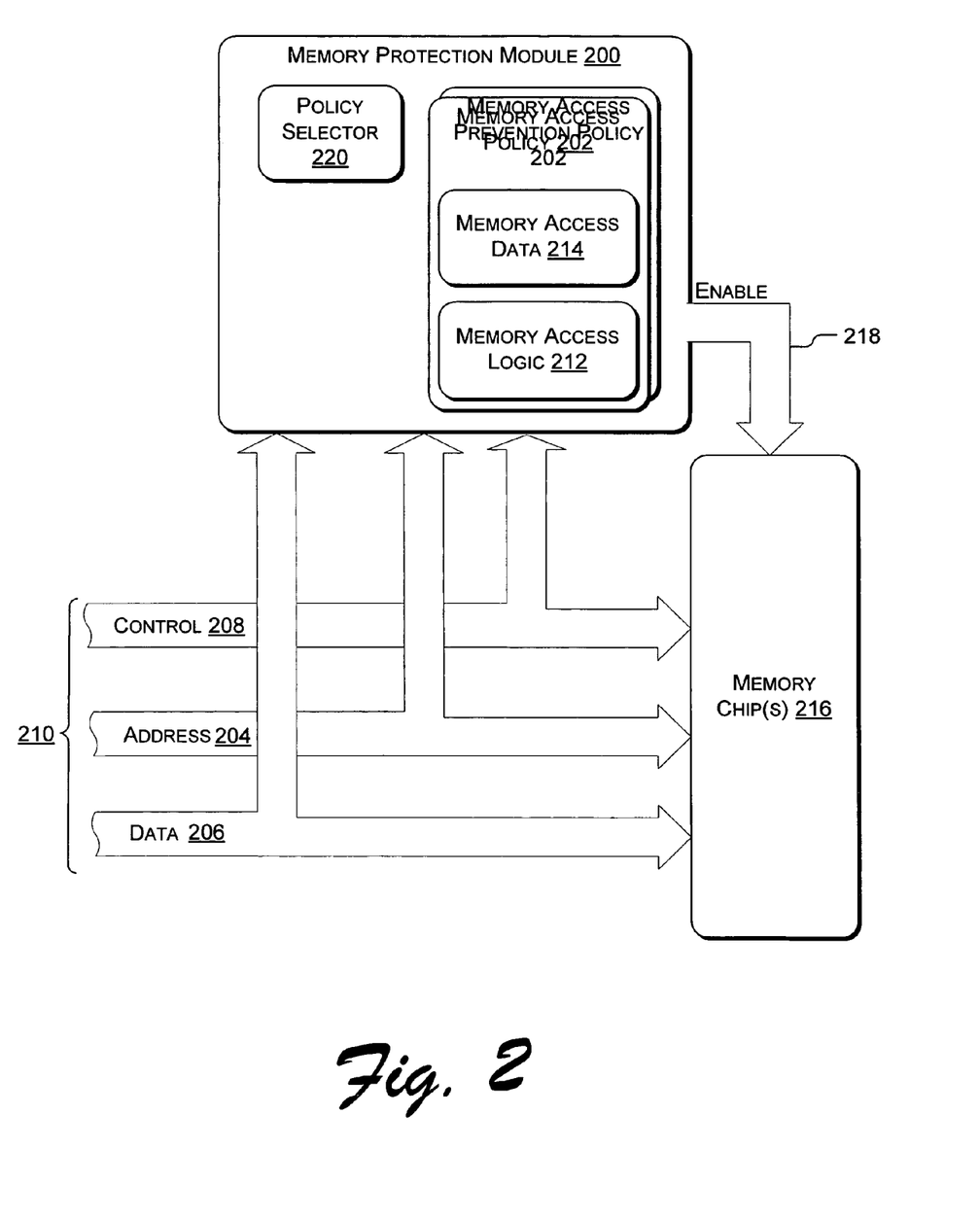
FIG. 2 illustrates an exemplary memory protection module for disabling or enabling accesses to system memory according to a memory access policy.

FIG. 2 illustrates an exemplary memory protection module (MPM) 200 for preventing certain memory accesses that are not in accordance with a memory access policy 202. The MPM 200 monitors address lines 204, data lines 206, and control lines 208 from a system bus 210. The MPM 200 receives address, data, and control data from the system bus 210. Memory access logic 212 uses the received data from address, data and control lines and memory access data 214 to determine whether an attempted memory access to one or more memory chips 216 should be prevented or permitted.

The memory chip(s) 216 comprise a portion of system memory in the computing device. As such, the memory chip(s) 216 span a range of memory addresses that may be accessed by the operating system, applications or other software operating on the computing device. Traditionally, defective software could transmit virtually any data over the system bus 210 to any memory region in the memory chip(s) 216. The MPM 200 acts as a "gatekeeper", controlling access to the memory chip(s) 216.

Data from the address lines 204 represent the memory addresses that are to be accessed (e.g., written to or read from). Data 206 represent the data that is either written to or read from addressed locations indicated on the address lines 204. Data on control lines 208 represent memory control signals, such as chip select, write enable, or read enable, which cause one or more of the memory chips 216 to be enabled for the memory access. Data on control lines 108 also specifies the type of memory access, such as read, write, and read/write access.

Although the address lines 204 and the data lines 206 are shown as being on separate busses as in a NOR technology implementation, it is to be understood that in alternative implementations (e.g., NAND technology), address lines 204 and data lines 206 may comprise the same physical bus. In such an implementation, the control signals 208 would be used by issuing memory commands to designate whether the data on the bus represents addresses or data.

Regardless of the particular bus technology used, the memory access logic 212 applies logic to various combinations of the data from the address lines 204, data lines 206, control lines 208, and memory access data 214. Based on results from the application of the logic, in one implementation, the memory access policy 202 sets (i.e., asserts to logical "1") or does not set (i.e., unasserts to logical "0") one or more enable signals 218 to the memory chip(s) 216 using positive logic. To further illustrate the memory access logic 214, particular implementations of the memory protection module 202 are shown and described below.

In an alternative implementation of the MPM 200, the separate enable signal 218 is not necessary. The MPM 200 can modify the control signals 200 to control the memory chip(s) 216. In this implementation, the MPM 200 drives the control signals 208 to enable or disable the memory chip(s) 216 as necessary.

The memory access data 214 includes data used by the memory access logic 212 for logically determining whether an attempted memory access is permitted. For example, the memory access data 214 can specify particular memory addresses spanned by the memory chip(s) 216 that are not to be written to. Particular implementations of memory access data 214 are shown and described further below. The memory access logic 212 and the memory access data 214 together make up the memory access policy 202.

The enable signals 218 and control signals 208 are dependent upon the types of memory chip(s) 216 being used. Depending on the electrical pins of the memory chip(s) 216, the enable signals may include write enable, read enable, chip select, write protect or other signals that can enable or disable access to the memory chip(s) 216. The memory protection module 200 can assert a delay signal or "wait" signal (not shown). The delay signal notifies the processing unit to not complete a current bus cycle until the delay signal is released. By asserting the delay signal, the MPM 200 can gain time to assert or unassert the enable signals 218 and/or control signals 208 before the memory chip(s) 216 are affected by data on the address 204, data 206, and control lines 208.

In a particular implementation of the MPM 200, multiple memory access policies 202 may exist. A policy selector 220 selects one of the policies 202 based on the data on the address lines 204, data lines 206, and control lines 208. Multiple policies 202 and the policy selector 220 can be useful to put the MPM 200 into a certain mode, depending on the situation. For example, one of the policies 202 may be more restrictive than another policy. The less restrictive policy can be used by a system administrator, for example, for debugging the computing device, while the more restrictive policy is used as the default memory access policy.

Figure 3:
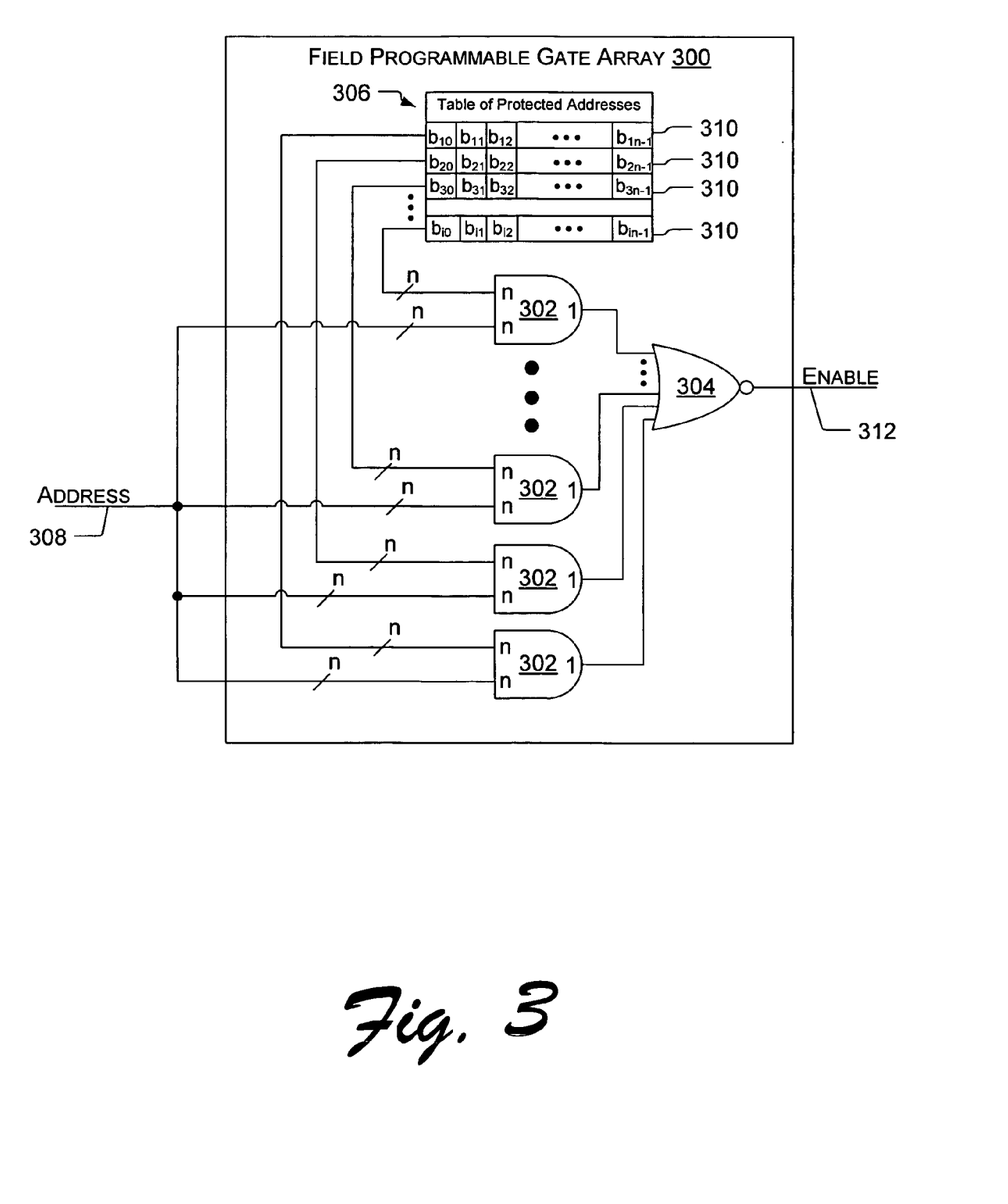
FIG. 3 illustrates an exemplary implementation of the memory protection module using a field programmable gate array (FPGA)

FIG. 3 illustrates an exemplary implementation of the memory protection module using a field programmable gate array (FPGA) 300. An FPGA is a programmable logic chip with a high density of gates. As is well-known by those skilled in the art, an FPGA is a very flexible device, in which almost any type of logic or data can be programmed and reprogrammed. The Xilinx Spartan family, Altera Flex family, and AT&T Orca family are examples of FPGAs. The FPGA 300 may be programmed (or reprogrammed) using a software language such as Very High Speed Integrated Circuit Hardware Description Language (VHDL) or Verilog.

As such, the FPGA 300 includes logic composed of a number gates arranged in this exemplary implementation as AND gates 302 and a NOR gate 304. The FPGA 300 also includes a table 306 of data representing a number of discrete protected memory addresses and/or protected memory address ranges. The exemplary logic and data shown in FIG. 3 are abstractly illustrated in the FPGA for illustrative purposes only.

For illustrative purposes, each of the AND gates 302 has inputs for two sets of 'n' binary data lines. One set of data lines represents an address from the address lines 308 in the computing device. The other set of binary data is data from the address table 306. The AND gates 302 may themselves be composed of a number of gates, with each gate comparing a bit from the address lines 308 with a corresponding bit from the address table 306.

With more specific regard to the address table 306, contained therein are 'i' data fields 310 (where i≧1), each data field 310 representing a memory address to be protected from access. Each data field 310 includes 'n' bits, with each of the 'n' bits corresponding to a bit in the protected address. For each of the 'i' addresses to be protected, there is an AND gate 302 for comparing an incoming address on the address lines 308 to the corresponding data field 310.

In an alternative implementation of the address table 306, the protected addresses may include address ranges along with specific addresses using 'don't care' values. For example, if addresses 0xABCD000–0xABCD00FF are to be protected (a 256 byte block), the last byte of the address (0x00–0XFF), regardless of the particular bit values, will not affect the outcome as to whether an incoming address is rejected. A protected address range may be specified with bits $b_{10}$ through $b_{in-1}$ taking on values of 0, 1, or a third 'don't care' value (e.g., 'X'). Continuing with the foregoing example, address range 0xABCD0000–0xABCD0FFF (a 4 Kbyte block) may be specified by setting bits $b_{20}$–$b_{211}$, equal to a 'don't care' value, such as 'X' (assuming that the lower order bits are the leftmost bits in the table 306). By continuing in this manner, the remaining addresses in table 306 could be used for specifying unique addresses or address ranges. The comparison logic in the FPGA only needs to examine address bits in the table that are significant. Hence, if there are many don't care conditions in the table, the logic simplifies as only bits containing a '0' or a '1' are needed in the comparison.

Each of the AND gates 302 outputs a binary 1 if the inputs match (i.e., each bit in the input data field 310 matches the corresponding bit on the address lines 308) or a binary 0 if the inputs do not match (i.e., one or more bits in the input data field 310 do not match the corresponding bit on the address lines 308). The outputs of the AND gates 302 are input into the NOR gate 304.

The function of the NOR gate 304 is to assert an enable signal 312 only if none of the addresses on the address lines 308 match the data fields 310 from the protected address table 306. Accordingly, if all the inputs to the NOR gate 304 are binary 0, indicating none of the address lines 308 match the protected addresses, the enable signal 312 will be asserted. However, if any one of the inputs to the NOR gate 304 are set to a binary 1, indicating that at least one set of data on the address lines 308 matches one of the data fields 310, the enable signal 312 will not be asserted, thereby not enabling the memory chip(s) containing the matching address.

Figure 4:
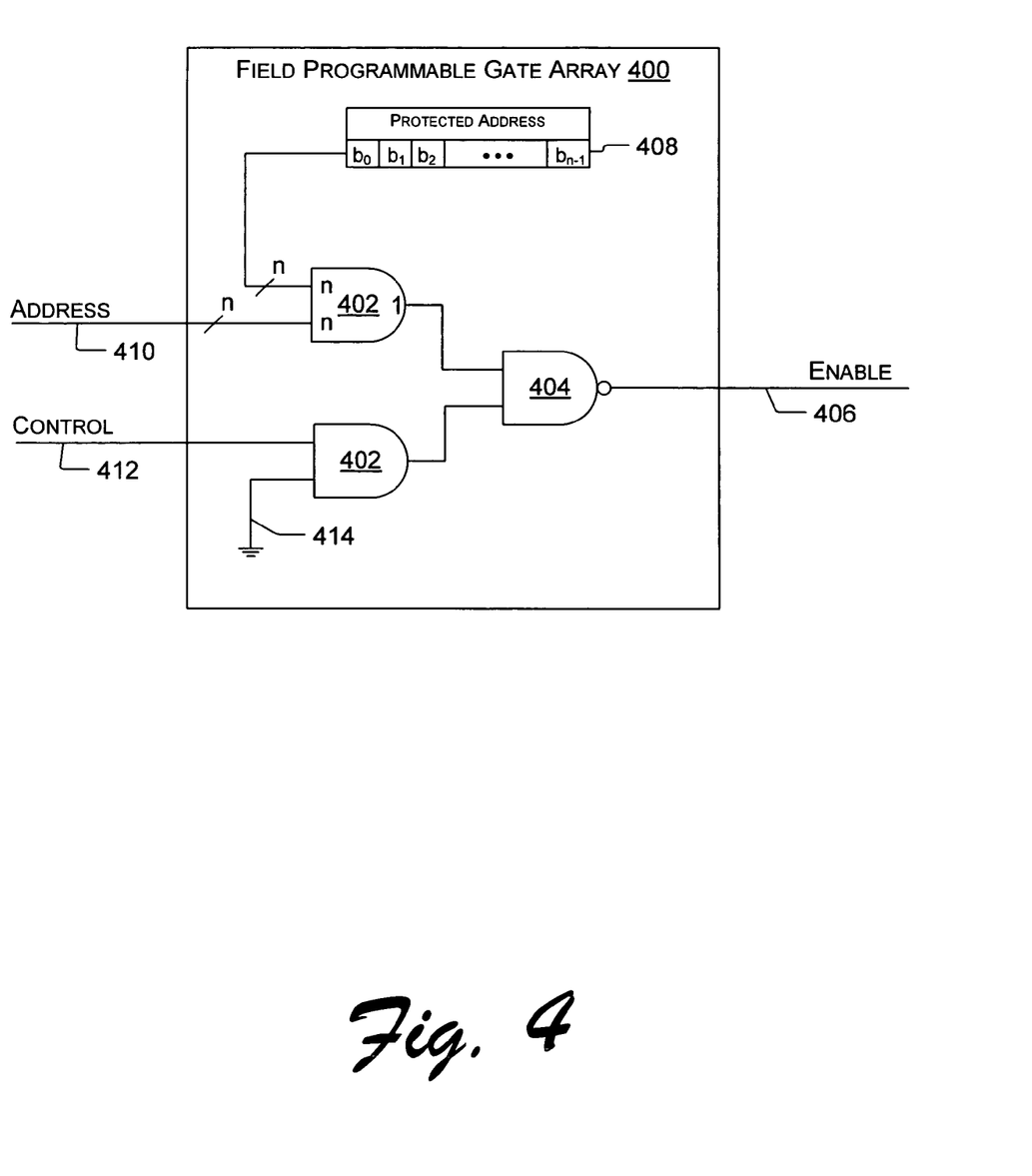
FIG. 4 illustrates another exemplary implementation of the memory protection module using a FPGA.

FIG. 4 illustrates another exemplary implementation of a memory protection module using a FPGA 400. In this exemplary implementation, AND gates 402 check whether a specified address is being written to, and if the specified address is being accessed in a certain manner, a NAND gate 404 unasserts an enable signal 406. The address is specified by a protected address data field 408. Data on address lines 410 are compared to the protected address data field 408. Simultaneously, data on control line 412 is compared to a specified logical voltage level 414.

The voltage level 414 corresponds to a type of memory access that is to be prevented. In the implementation shown, the voltage level 414 is ground. Depending on the types of memory chips being used and the particular control lines 412 being monitored, ground indicates either a read or a write access. Those skilled in the art will appreciate that the control signal 412 and the voltage level 414 can be selected in a particular implementation to prevent or allow either a read or write from or to the protected address 408. In this example, a logical "1" on enable signal 406 allows a memory access and a logical "0" on enable signal 406 disallows a memory access, voltage level 414 is used to enable the memory protection module by setting it high or to bypass the MPM by setting it low in the case of field service or other specially authenticated software such as updating the operating system.

The NAND gate 404 receives the outputs of the AND gates 402. If both the inputs to the NAND gate 404 are asserted, meaning an attempted type of access to the protected address, the enable signal 406 is de-asserted to prevent the attempted write; otherwise, the enable signal 406 is asserted to allow the attempted write.

Figure 5:
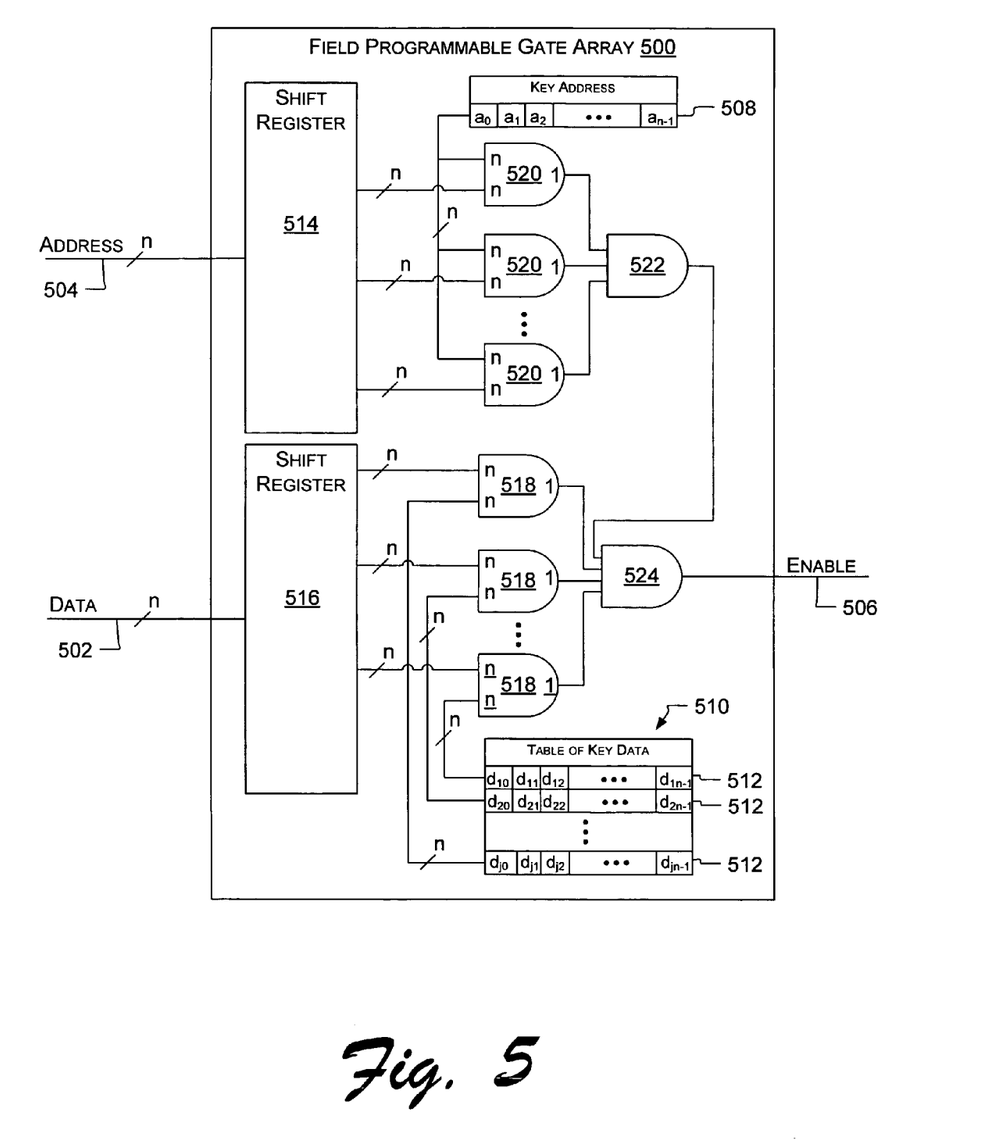
FIG. 5 illustrates another exemplary implementation of the memory protection module using a FPGA.

FIG. 5 illustrates another exemplary implementation of a memory protection module (MPM) using a FPGA 500. The FPGA 500 analyzes sequences of data on data lines 502 and address lines 504, to determine if a series of accesses from a specified address have been made. If the series of accesses have been made to the specified address, enable signal 506 is asserted. This implementation can be used to "unlock" an otherwise protected region in memory, if the user knows the particular sequence of data and the specified address.

This particular implementation may be useful for choosing among multiple memory access policies. As such, the implementation shown in FIG. 5 can be used in conjunction with the implementation shown in FIG. 6, described below, for unlocking memory regions with a specified key address and key data. The specified address is given by a key address data field 508, which includes 'n' address bits, $a_0$ through $a_{n-1}$. The specified key data is given by a table of key data 510 having 'j' key data fields 512, each containing 'n' data bits.

Shift registers, address shift register 514 and data shift register 516, shift in data from the address lines 504 and the data lines 502, 'n' bits at a time, respectively. One implementation of the FGPA 500 uses 32×8, parallel-in, parallel-out shift registers. The outputs of the address shift register 514 are composed of a series of 'j' addresses, shifted in time, from the address lines 504. Similarly, the outputs of the data shift register 516 are composed of a series of 'j' sets of data, shifted in time, from the data lines 502. In this implementation, an address protection operation involves writing a sequence of data to MPM registers contained within the FPGA 500. The MPM then compares this sequence of values with an 'unlock key' to determine if the addressed memory is to be made accessible (i.e., unlocked).

A set of AND gates 518 compare each set of the time-shifted data to one of the data fields 512 from the table of key data 510. Another set of AND gates 520 compares each time-shifted address with the key address 508. Outputs from the AND gates 520 are input into another AND gate 522 to determine if all the time-shifted addresses match the key address. The outputs of the AND gates 518 and the AND gate 522 are input into another AND gate 524 to determine whether the series of data accesses matched the data in the table of key data 510 and were directed to the key address 508. If so, the enable signal 506 is asserted; if not, the enable signal is not asserted.

Figure 6:
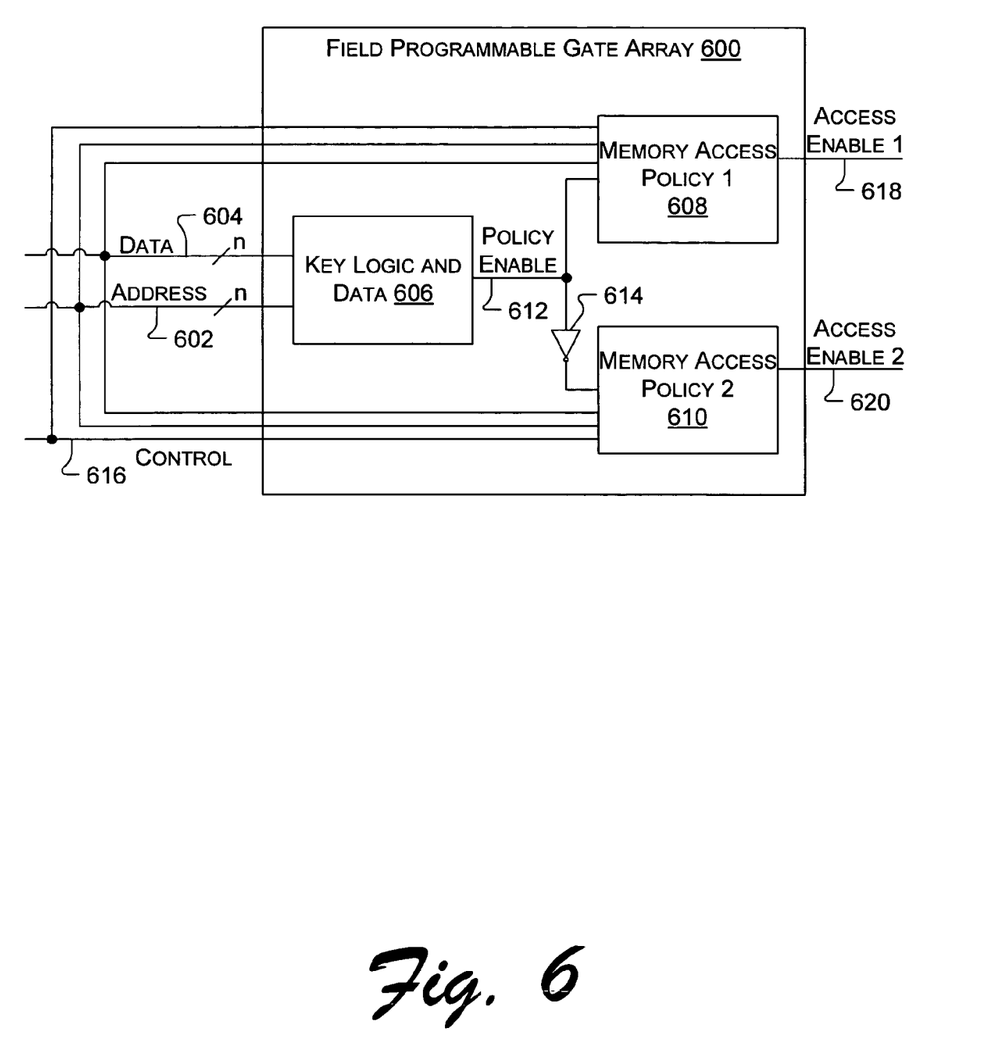
FIG. 6 illustrates yet another exemplary implementation of the memory protection module using a FPGA.

FIG. 6 illustrates another exemplary implementation of the memory protection module using a FPGA 600, in which one of two memory access policies is selected based on data from address lines 602 and data lines 604. A key logic and data module 606 receives the data from address lines 602 and data lines 604, and applies logic and data to determine whether memory access policy 1 608 should be enabled or memory access policy 2 610 should be enabled.

As discussed above with respect to FIG. 5, the implementation shown in FIG. 5 can be used as the key logic and data 606 of the FPGA 600. However, other implementations of the key logic and data 606 are readily realizable for selecting among multiple memory access policies. The key logic and data 606 outputs a policy enable signal 612. The policy enable signal 612 is inverted by inverter 614 prior to the memory access policy 2 610, but is not inverted to the memory access policy 1 608, to ensure that both policies are not enabled simultaneously.

The memory access policies 608 and 610 can be implemented using any of the implementations shown above, or other implementations. Thus, the memory access policy 1 608 and the memory access policy 2 610 include logic and data for analyzing any combination of data on address lines 602, data lines 604, and control lines 616 from the bus in the computing device. Based on the analysis, each of the memory access policy 1 608 and the memory access policy 2 610 output corresponding enable signal 1 618, and enable signal 2 620, respectively.

Exemplary Operations

Described herein are exemplary methods for controlling memory access. The methods described herein may be embodied as logic instructions on one or more computer-readable medium. When executed on a processor, the logic instructions cause a general purpose computing device to be programmed as a special-purpose machine that implements the described methods. In the following exemplary operations, the components and connections depicted in the figures may be used to implement memory protection.

Figure 7:
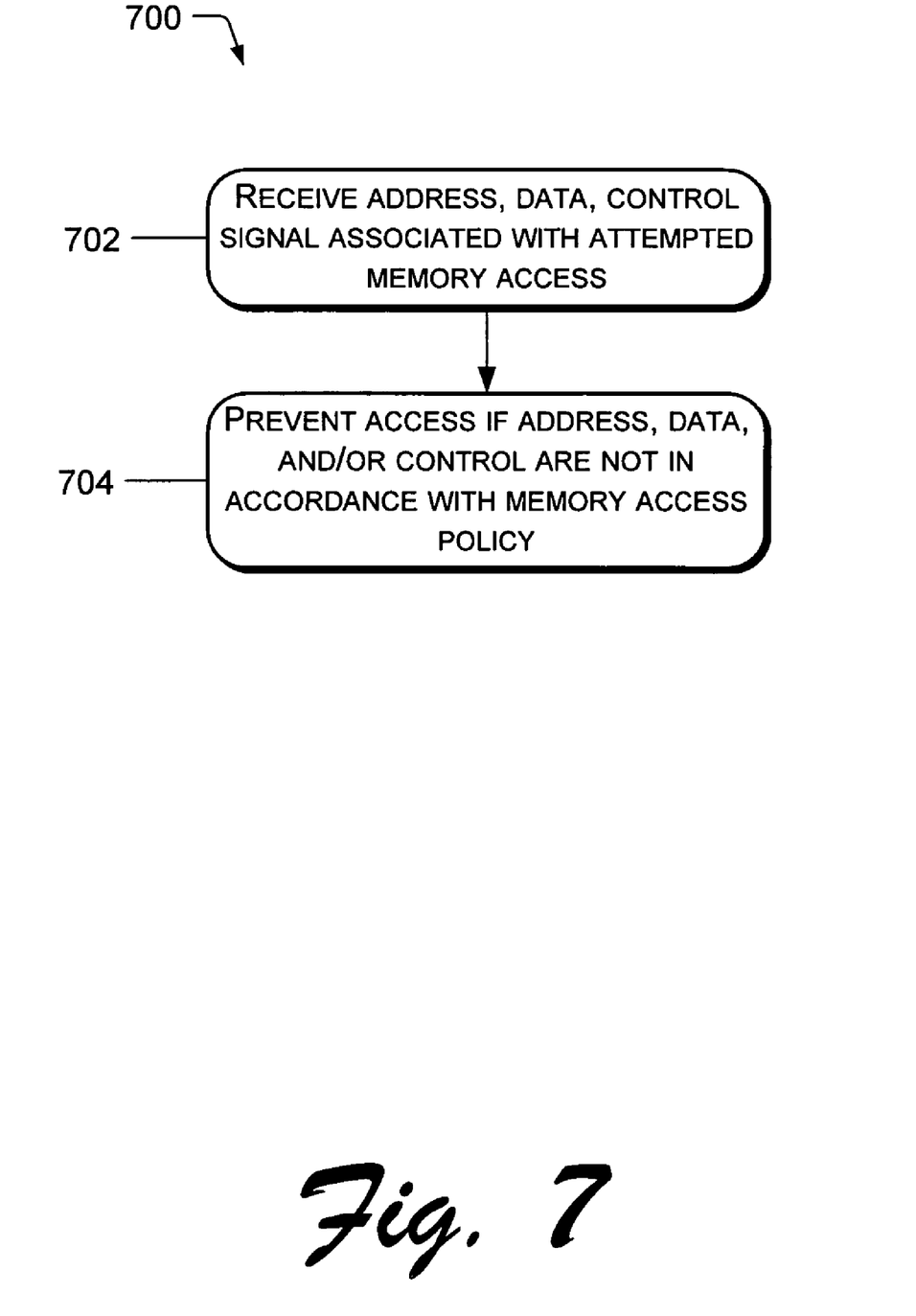
FIGS. 7–8 illustrate algorithms for controlling an attempted access to system memory.

FIG. 7 illustrates a memory access policy algorithm 700 for allowing memory accesses according to a memory access policy. A receiving operation 702 receives address, data, and/or control data from a bus in a computing device. The address, data, and control data are associated with an attempted memory access in the computing device.

A preventing operation 704 prevents the attempted memory access if the address, data, and/or control data are not in accordance with a memory access policy. One implementation of the preventing operation 704 applies logic to some combination of the address, data, and/or control data to determine whether the attempted memory access is permitted, and sets an enable signal only when the attempted access is permitted.

Another implementation of the preventing operation 704 prevents reads from a specified region in system memory. This implementation of the preventing operation 704 monitors address data and control signals to determine whether the type of attempted memory access is a read, and whether the specified address is attempted to be read from.

Another implementation of the preventing operation 704 prevents writes to a specified region in system memory. This implementation of the preventing operation 704 monitors address data and control signals to determine whether the type of attempted memory access is a write, and whether the specified address is attempted to be written to. Erase is a type of write operation. In implementations using NAND flash memory, for example, flash memory must be erased before it can be written to (e.g., a bit cannot be changed from logical '0' to logical '1' without first erasing, thereby setting the bit back to logical '1')

When an attempted memory access is not permitted, the preventing operation 704 can disable memory, trigger an exception (e.g., a software or hardware interrupt), log an error, and/or reboot the device. Rebooting may involve rebooting the device into a predetermined safe mode.

Figure 8:
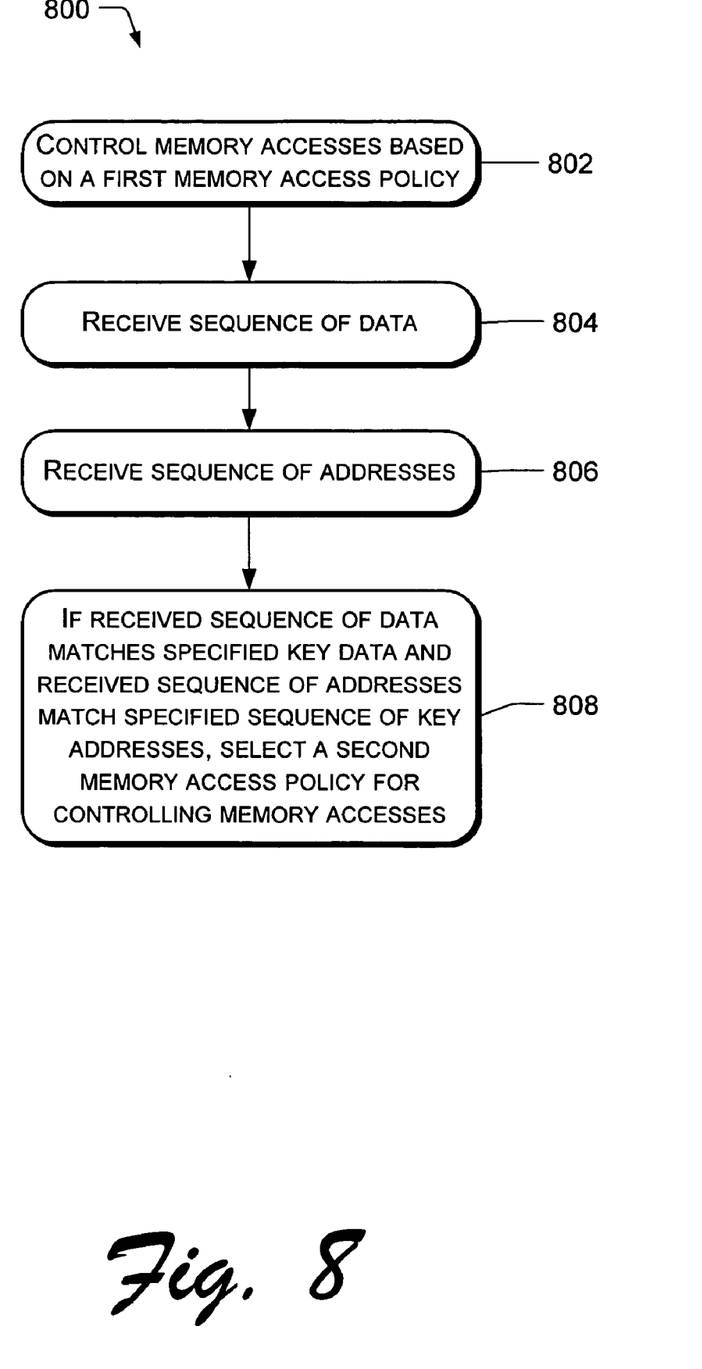

FIG. 8 illustrates a memory access policy selection algorithm 800 for selecting between two or more memory access policies. A controlling operation 802 controls memory accesses based on a first memory access policy. The controlling operation 802 can occur on system start-up, such as the boot process, and during this process, the controlling operation 802 chooses a default memory access policy by which to control memory accesses.

A receiving operation 804 receives a sequence of data from a data bus in the computing device. Another receiving operation 806 receives a sequence of addresses from an address bus in the computing device. A selecting operation 808 logically analyzes the received sequences of addresses and data to determine whether a second memory access policy should be selected.

One implementation of the selecting operation 808 determines whether the sequence of addresses match one or more specified addresses and the sequence of data matches one or more specified data. If the sequence of addresses match the one or more specified addresses and the sequence of data matches the one or more specified data, the selecting operation selects the second memory access policy. The selecting operation 808 may select the second memory access policy by asserting an enable signal to the second policy, setting a flag indicating that the second policy should be enabled, or otherwise.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer-readable media. Computer-readable media can be any available media that can be accessed by a computer. By way of example, and not limitation, computer-readable media may comprise "computer storage media" and "communications media."

"Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer-readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed is:

1. A method for securing a specified region of memory in a computing system having a microprocessor executing an operation system, the method comprising:
   receiving data from a system bus, the data characterizing an aftempted memory access;
   determining whether the attempted memory access violates a memory access policy based on the data from the system bus; and
   preventing the attempted memory access if the attempted memory access violates the memory access policy wherein the receiving, determining, and preventing operations are independent of the microprocessor and are carried out by logic in a field programmable gate array (FPGA) that is capable of analyzing sequences of data to determine if a series of accesses from a specified address have been made, and that is capable of asserting an enable signal if the series of addresses have been made.

2. A method as recited in claim 1 wherein the receiving comprises receiving a memory address and a memory control signal indicating a type of memory access, the method further comprising modifying the control signal based on the memory address and the type of memory access.

3. A method as recited in claim 2 wherein the modifying comprises modifying the control signal to prevent the attempted memory access if the memory address is within a region specified by the memory access policy and the type of memory access is a type specified by the memory access policy.

4. A method as recited in claim 1 wherein the preventing operation comprises preventing the attempted memory access if the attempted memory access is a read access.

5. A method as recited in claim 1 wherein the preventing operation comprises preventing the attempted memory access if the attempted memory access is a write access.

6. A method as recited in claim 1 wherein the memory access policy compnses memory access data specifying the region in memory to be secured.

7. A method as recited in claim 1 wherein the computing system is an embedded system.

8. A method as recited in claim 1 wherein the preventing operation comprises performing one or more of issuing an interrupt, restarting the computing system, flagging an error, or disabling a memory device.

9. A method as recited in claim 1 wherein the determining operation comprises comparing a received memory address to one or more memory addresses in a specified region in memory.

10. A method as recited in claim 1 further comprising selecting the memory access policy from among a plurality of memory access policies.

11. A method performed in a computing device having a microprocessor executing an operating system, the method comprising:
    receiving an address from the microprocessor during an attempted memory access;
    determining whether the address is within a range of one or more specified addresses to be protected; and
    preventing the attempted memory access if the address is within the range of one or more specified addresses to be protected;
    wherein one or more of the determining and preventing operations are independent of the microprocessor and wherein the receiving, determining, and preventing operations are carried out by logic in a field programmable gate array that is capable of analyzing sequences of data to determine if a series of accesses from a specified address have been made, and that is capable of asserting an enable signal if the series of addresses have been made.

12. A method as recited in claim 11 wherein the preventing operation comprises preventing the attempted memory access if the address is within the range of one or more specified addresses to be protected and a memory control signal indicates that the attempted memory access is an attempted write to the address.

13. A method as recited in claim 11 further comprising asserting, independent of the microprocessor, a delay signal to delay the attempted memory access.

14. A method as recited in claim 11 further comprising;
    determining that a sequence of memory addresses matches a specified sequence of memory addresses; and
    in response to determining that a sequence of memory addresses matches a specified sequence of memory addresses, enabling another attempted memory access of an address within the range of the one or more specified addresses to be protected.

15. A system comprising:
    a microprocessor executing operating system software;
    a memory;
    a bus connecting the microprocessor to the memory; and
    a memory protection module operably independent from the microprocessor, the memory protection module contiolling access by the microprocessor to the memory based on signals received from the microprocessor, wherein the memory protection module comprises a field programmable gate array that is capable of analyzing sequences of data to determine if a series of accesses from a specified address have been made, and that is capable of asserting an enable signal if the series of addresses have been made.

16. A system as recited in claim 15 wherein the memory protection module further comprises a memory access policy determining whether to prevent an attempted access to the memory based on the signals received from the microprocessor.

17. A system as recited in claim 15 wherein the memory protection module further comprises:
    a plurality of memory access policies; and
    a memory access policy selection module operable to select one of the plurality of memory access policies.

18. A system as recited in claim 17 wherein the memory access policy selection module selects the one of the plurality of memory access policies based on a combination of address, data, and memory control signals received from the bus.

19. A system as recited in claim 15 wherein the field programmable gate array and the microprocessor are integrated on a common chip.

20. A system as recited in claim 15, wherein the memory protection module further comprises a memory access policy having address data specifying one or more memory addresses to which access by the microprocessor will be prevented by the memory protection module.

21. A system as recited in claim 15, wherein the memory protection module further comprises:
    a plurality of memory access policies; and
    a memory access policy selection module operable to select one of the plurality of memory access policies based on sequences of addresses and data received from the bus.

22. A system as recited in claim 15, wherein the memory protection module further comprises:
    a first memory access policy preventing access by the microprocessor to a protected region in the memory; and
    a second memory access policy allowing access by the microprocessor to the protected region in the memory only if a specified sequence of data has been written to a specified address in the memory.

23. A computer program product encoding a computer program for executing a computer process on a computer system having a system memory and a microprocessor executing an operating system, the computer process comprising:
    receiving from the microprocessor via a system bus, address, data, and control signals characterizing an attempted memory access;
    independent from the microprocessor, controlling access to a protected portion of the system memory based on a memory protection policy and a combination of one or more of the address, data, and control signals;
    analyzing sequences of data to determine if a series of accesses from a specified address have been made; and
    asserting an enable signal if the series of addresses have been made.

24. A computer program product as recited in claim 23, wherein the controlling operation comprises determining that the address signals identify an address in a range of addresses specified by the memory protection policy and issuing a disable signal to disable a memory device comprising the protected portion of the system memory.

25. A computer program product as recited in claim 23, wherein the controlling operation comprises:
    determining that the attempted system memory access violates the memory protection policy; and
    modifying a control signal on the system bus to prevent the attempted memory access.

26. A computer program product as recited in claim 23, wherein the controlling operation comprises determining whether a specified sequence of data has been written to the system memory and granting access to the protected portion of system memory if the specified sequence of data has been written to the system memory.

27. A system comprising:
a system memory;
a microprocessor executing an operating system;
a system bus interconnecting the system memory and the microprocessor, via which the microprocessor may access the system memory; and
means for controlling access to a region of the system memory based on a combination of address, data, and memory control data received from the system bus, wherein the means for controlling access is independent of the microprocessor and the system memory wherein the means for controllin access comprises a field programmable gate array (FPGA) connected to the system bus, the FPGA having memory protection logic for preventing the microprocessor from accessing the region of the system memory, that is capable of analyzing sequences of data to determine if a series of accesses from a specified address have been made, and that is capable of asserting an enable signal if the series of addresses have been made.

* * * * *

UNITED STATES PATENT AND TRADEMARK OFFICE
CERTIFICATE OF CORRECTION

PATENT NO.        : 7,210,014 B2                                              Page 1 of 1
APPLICATION NO.   : 10/855065
DATED             : April 24, 2007
INVENTOR(S)       : Sharon Drasnin et al.

It is certified that error appears in the above-identified patent and that said Letters Patent is hereby corrected as shown below:

On the Title page, in field (54), under "Title", in column 1, line(s) 1–2, delete "ALTERNATIVE METHODS IN MEMORY PROTECTION" and insert -- MEMORY ACCESS PREVENTION USING FIELD PROGRAMMABLE GATE ARRAY INDEPENDENT FROM THE MICROPROCESSOR --, therefor.

On the Title page, in field (75), under "Inventors", in column 1, line 2, delete "Lansinger" and insert -- Lansigner --, therefor.

In column 1, line(s) 1–2, delete "ALTERNATIVE METHODS IN MEMORY PROTECTION" and insert -- MEMORY ACCESS PREVENTION USING FIELD PROGRAMMABLE GATE ARRAY INDEPENDENT FROM THE MICROPROCESSOR --, therefor.

In column 4, line 31, delete "of" and insert -- or --, therefor.

In column 6, line 31, delete "0xABCD000" and insert -- 0xABCD0000 --, therefor.

In column 6, line 33, delete "(0x00-0XFF)" and insert -- (0x00-0xFF) --, therefor.

In column 9, line 13, after "'1')" insert -- . --.

In column 10, line 32, in Claim 1, delete "aftempted" and insert -- attempted --, therefor.

In column 10, line 64, in Claim 6, delete "compnses" and insert -- comprises --, therefor.

In column 11, line 18, in Claim 11, delete "he" and insert -- be --, therefor.

In column 11, line 40, in Claim 14, after "comprising" delete ";" and insert -- : --, therefor.

In column 11, line 55, in Claim 15, delete "contiolling" and insert -- controlling --, therefor.

In column 14, line 2, in Claim 27, delete "controllin" and insert -- controlling --, therefor.

Signed and Sealed this

Twenty-fourth Day of August, 2010

David J. Kappos
*Director of the United States Patent and Trademark Office*